United States Patent Office 3,307,224
Patented Mar. 7, 1967

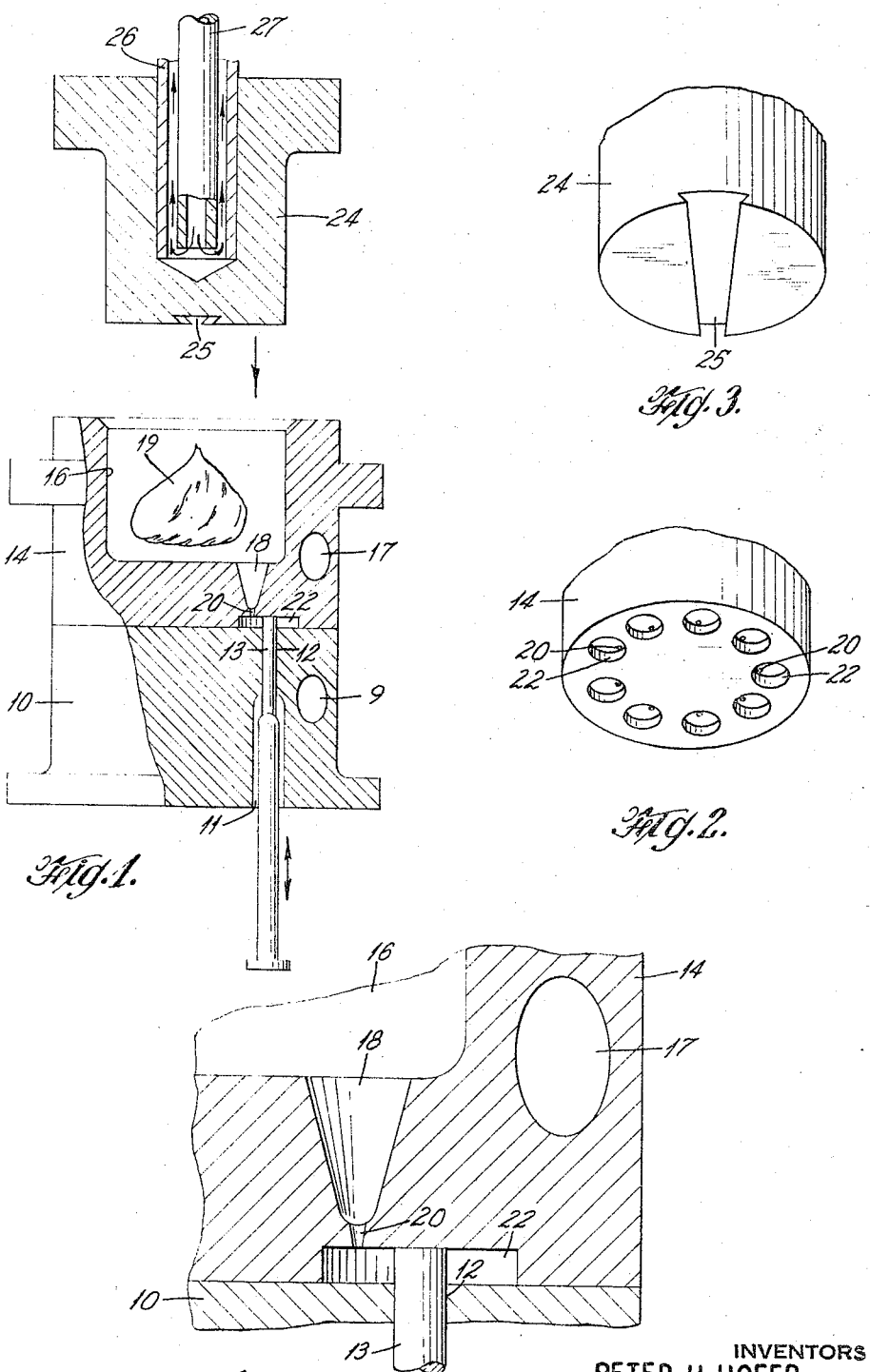

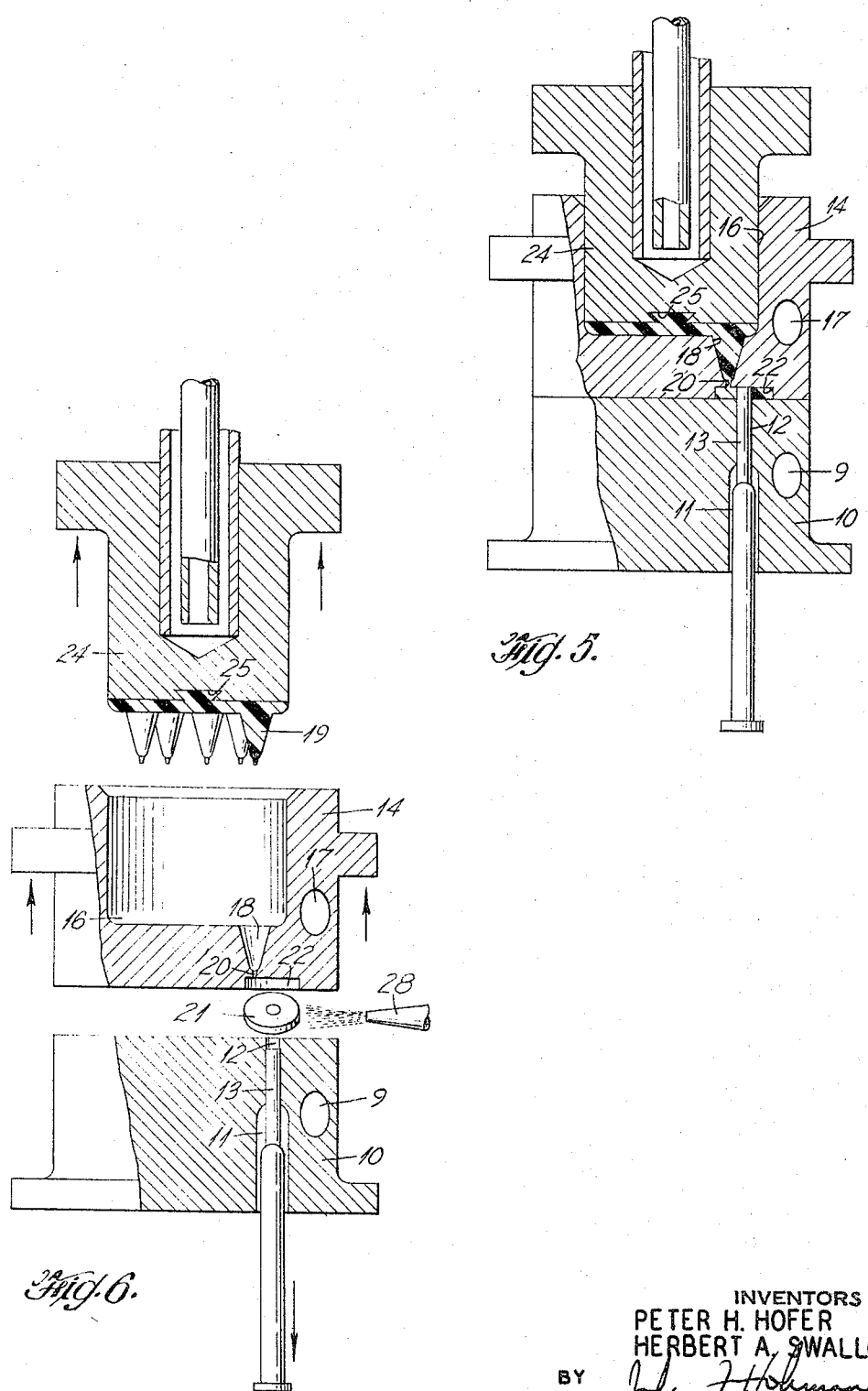

3,307,224
APPARATUS FOR MOLDING PLASTIC ARTICLES
Peter H. Hofer, Berkeley Heights, and Herbert A. Swallow, North Branch, N.J., assignors to Union Carbide Corporation, a corporation of New York
Filed Aug. 13, 1964, Ser. No. 389,254
5 Claims. (Cl. 18—42)

This invention relates to the melt compression molding of plastic articles. More particularly, this invention relates to an improved apparatus for melt compression molding sprue-free plastic articles. Even more particularly, this invention relates to an improved apparatus for melt compression molding sprue-free apertured plastic articles such as coaxial cable spacers.

Melt compression molding whereby a metered charge or pellet of molten plastic material is formed by pressure between matching die halves into a molded article, suffers from several drawbacks. For example, the weight of the charge of molten plastic material must be exactly equal to the weight of the article to be molded otherwise incomplete molding or flash formation takes place. Consequently the use of ultra precise metering devices is required. Furthermore, one charge is generally only molded into one article which limits the versatility and efficiency of melt compression molding. In those instances where it is desired to mold clear articles such as a flashlight lens, melt compression molding is unsuitable because the outline of the charge or pellet becomes visible in the molded articles. Furthermore, if the pellet is not placed in the exact center of the mold, characteristic "half-moons" appear in the molded article. These effects can be somewhat minimized by increasing the temperature of the plastic charge, but this only introduces problems of handling the sticky charge and mitigates against the advantages gained through melt compression molding.

Another specific problem that has existed for some time relates to the molding of apertured plastic articles such as coaxial cable spacers where dimensional and electrical property tolerances are at a minimum and high-speed, efficient production is an economic necessity. For example, in 50 miles of coaxial cable, there are 3,168,000 washer-shaped cable spacers generally made from polyethylene. Consequently, an electrical or dimensional defect in each spacer would be greatly amplified and could render the finished coaxial cable useless. Hot molding processes are generally unsuitable for making such apertured articles because they tend to introduce a dimensional or property defect in the molded article or they are not capable of high speed production rates. For instance, injection molding processes are notorious for leaving a sprue on a molded article which cannot be tolerated in a coaxial cable spacer or similar article. Cold forming techniques, such as stamping or cutting coaxial cable spacers from plastic sheets, are limited because they require high maintenance, ultra precision dies and result in the formation of large amounts of scrap. Furthermore, a spacer produced by cold forming has tapered sides and holes and is contaminated by "feathers" or fines which are created during the forming operation. These loosely adhering particles jam assembly machinery and cause electrical defects to appear in the finished cable.

It is therefore an object of this invention to provide improved apparatus for melt compression molding plastic articles which overcomes the drawbacks described herein.

It is another and highly specific object of this invention to provide an improved apparatus for melt compression molding coaxial cable spacers within tolerable dimensional and property limits.

The present invention will be further understood from the following description taken in conjunction with the accompanying drawings wherein:

FIGURE 1 is a view partly in elevation and partly in section of the preferred molding apparatus of this invention.

FIGURE 2 is a perspective view of the bottom of the upper mold of the preferred apparatus shown in FIGURE 1.

FIGURE 3 is a perspective view of the bottom of the piston of the preferred apparatus shown in FIGURE 1.

FIGURE 4 is an enlarged view of a portion of the preferred apparatus shown in FIGURE 1.

FIGURES 5 and 6 are views of the preferred apparatus shown in FIGURE 1 showing the relative positions of the apparatus components during two stages of the molding cycle.

Broadly, the improved apparatus of the present invention comprises means forming a lower mold portion and means forming an upper mold portion which is adapted to cooperatively define one or more mold cavities with the lower mold portion, a transfer cylinder in the upper mold portion, a passageway in communication with the transfer cylinder, a sprue forming channel in communication with the passageway and mold cavity, means for supplying a metered charge of hot or molten plastic material to the transfer cylinder, transfer piston means adapted to slide in the transfer cylinder and cause the plastic material to fill the mold cavity and the sprue forming channel, means to cool the mold portions and the transfer piston, means on the transfer piston for removing excess plastic material from the upper mold portion, means to separate the mold portions and means for removing a molded article from therebetween. In addition, aperture forming means can be provided extending into a mold cavity and adapted to slide in the lower mold portion.

As indicated above, the drawings illustrate the preferred apparatus of the present invention which is essentially adapted for producing coaxial cable spacers. It is for purposes of convenience only that the following description and drawings are specifically directed to the molding of coaxial cable spacers from polyethylene. It will be obvious to those skilled in the art that many modifications and changes can be made in the method and apparatus of this invention without departing from the spirit and scope thereof. It will also be obvious that a wide variety of plastic articles of all shapes and sizes, with or without apertures or inserts therein, can be molded according to the present invention.

Specifically referring to FIGURES 1 through 4, the preferred apparatus of this invention is shown to include a lower mold portion 10 having a recess 11 and a cylindrical passageway 12 adapted to receive a reciprocative aperture forming pin 13. Surmounting the lower mold portion 10 is an upper mold portion 14 having a transfer cylinder 16, a passageway 18 in communication therewith, and a sprue forming channel 20 in communication with the passageway 18 and a mold cavity 22 which is cooperatively defined by the mold portions 10 and 14. As is more clearly shown in FIGURE 2, the mold portions 10 and 14 can cooperatively define a plurality of mold cavities 22 all of which have a passageway 18 and a sprue forming channel 20 by means of which each of the mold cavities 22 is in communication with the transfer cylinder 16. In the drawings, the orifices 20 of the sprue forming channels are shown to be positioned off-center so as not to interfere with the aperture forming pins 13.

The passageway 18, more clearly shown in FIGURE 4, progressively decreases in cross section from the cylinder 16. This shape for the passageway 18 is conveniently employed to insure ease of separation of a cooled plastic material therefrom. The sprue forming channel 20 is shown in FIGURE 4 to be smaller than and to progressively decrease in cross section from the passageway 18 (that is the maximum diameter of channel 20 is less then the minimum diameter of passageway 18 as is clearly shown in FIGURE 4). The configuration for the sprue forming channel 20 has a zero land, that is there is no portion constant in cross section. For this reason, problems such as elongation of plastic material when removed from a portion of constant cross section are eliminated. For purposes of the present invention, the sprue forming channel 20 is also sufficiently small to cause a molten plastic material flowed therethrough to undergo molecular shear and thereby generate frictional heat. This unique feature eliminates pellet outlines and "half-moons" heretofore encountered with prior apparatus for melt compression molding. Furthermore, this feature also provides for good color dispersion and complete fillout of the mold cavity.

The mold portions 10 and 14 are conveniently provided with the internal conduits 9 and 17 respectively for purposes of circulating a cooling fluid therethrough to cool the mold portions.

Associated with the transfer cylinder 16 is transfer piston 24 having concentrically arranged conduits 26 and 27 for purposes of circulating a cooling fluid therethrough as indicated by the arrows in FIGURE 1. The face of piston 24 is also provided with a centrally located tapering dovetail slot 25 which extends across the bottom of the piston 24 as is more clearly shown in FIGURE 3. By means of the slot 25 excess cooled plastic material is removed from the upper mold portion 14 as is more fully described below.

The operation of the apparatus shown in the drawings will be briefly described with particular reference to FIGURES 1, 5 and 6. Polyethylene is fluxed in a suitable extruder (not shown) and is conveyed thereby to a suitable metering pump (not shown). From the pump, the molten polyethylene is fed through a nozzle and cut off by a suitable mechanism and supplied to the transfer cylinder 16 as molten charge 19 as shown in FIGURE 1. The piston 24 is then slid by suitable means into the transfer cylinder 16 and is employed to apply a primary force to cause the molten charge of polyethylene to flow and fill the mold cavities 22, the sprue forming channels 20, the passageway 18, a portion of the transfer cylinder 16 and the dovetail slot 25 of the piston 24. When this filling is complete, as shown in FIGURE 5, the polyethylene in the mold caviites 22 is cooled while a secondary force, generally less than the primary filling force, is simultaneously applied by the piston 24 such that the molten polyethylene 19 continues to flow due to molecular shear through the sprue forming channels 20 to compensate for shrinkage of the cooling polyethylene in the mold cavities 22. In this manner a molded article which is a true reproduction of the mold cavity in insured. After shrinkage of the polyethylene in the mold cavities 22 is substantially completed, application of the secondary force by the piston 24 is terminated and the polyethylene in the sprue forming channels 20 is allowed to cool in the absence of positive pressure. Because the polyethylene in the sprue forming channels 20 is surrounded by the cool mold portion 14, sprues are formed before the polyethylene immediately underlying the sprues is completely cooled. This is due to the fact that the polyethylene underlying the sprues is more remote from the cooling mold 14 and hence will cool more slowly than the polyethylene in the sprue forming channels 20. The method of the present invention takes advantage of this phenomenon to produce a sprue free spacer by separating the cooled sprues from the polyethylene in the mold cavities 22 before the polyethylene underlying the sprue is cooled. Since the uncooled polyethylene is weak compared to the cooled sprues, separation is accomplished with ease. The separation can take place at the exact upper surface of the mold cavities 22 but in practice when the sprues are separated from the polyethylene in the mold cavities 22, a small amount of polyethylene is separated with the sprues leaving a minute depression in the surface of the spacers which in no way is a dimensional defect in the spacer.

Polyethylene in the dovetail slot 25 is cooled by the piston 24 and provides the means whereby the above described sprue separation is accomplished when the piston 24 is withdrawn from the transfer cylinder 16. This is shown in FIGURE 6. The excess polyethylene or cullet 19 removed by the piston 24 is subsequently removed therefrom by a force applied to the edge of the cullet 19 which slides the same out of the dovetail slot 25. The cullet 19 can then be recycled to the extruder as desired.

For purposes of this invention it is preferred that the center line of the tapering dovetail slot 25 coincide with a diameter line of the transfer piston 24 as is illustrated in FIGURE 3. When the slot 25 is so positioned, the cooling polyethylene will shrink towards this center line which will eliminate any binding between the polyethylene and the slot 25. In practice, that portion of cullet 19 in the slot 25 will be slightly smaller than the slot 25 because of shrinkage on cooling and consequently the cullet 19 can be removed from the slot with ease. It should also be understood that more than one slot positioned and shaped in such a manner so as to prevent binding on cooling can be employed.

After the piston 24 is retracted removing therewith excess polyethylene 19, the mold portions 10 and 14 are separated by suitable means, the aperture forming pins 13 are retracted by suitable means and the finished spacers 21 are removed conveniently by a blast of air from nozzle 28. This is shown in FIGURE 6. Because molten polyethylene will shrink towards the center when cooled, polyethylene in the mold cavities 22 will shrink onto the aperture forming pin 13. This behavier can best be utilized by first raising the upper mold portion 14 as shown in FIGURE 6. Because the spacers 21 have shrunk onto the pins 13, they are held in place and will separate with ease from the mold cavities 22. The pins 13 can then be retracted and the spacers 21 removed.

The ratio of the area of the face of the transfer piston to the area of the molded articles can range from about 4:1 to about 1:1.9 but for most all practical purposes it is in the range of from about 1:1 to about 1:1.9. The latter range is preferred for most applications since it provides a means of keeping waste down to a minimum and allows for the use of high forming pressures and hence more efficient operating rates.

From the foregoing, it will be obvious that the components of the apparatus shown in the drawings can be used in a molding cycle which comprises a coordinated series of timed operations. As such the apparatus of this invention is ideally suited for high-speed, efficient production of molded articles, sprue-free molded articles, and sprue-free apertured molded articles such as coaxial cable spacers and the like.

Several modifications of the apparatus shown in the drawings can be mentioned as being representative of modifications and changes which can be made within the scope of this invention. For example, the upper mold portion 14 may rest under the force of gravity on lower mold portion 10 or may be clamped thereon during the molding cycle. Also, suitable guide means may be utilized between the mold portion 10 and 14 and for the piston 24 to insure proper alignment.

The manner in which the mold portions 10 and 14 cooperate to define the mold cavities 22 may vary from that shown in FIGURE 1. For instance, the mold cavities may be intermediate the mold portions or entirely in the lower mold portion, the opposite of that shown in FIGURE 1. It is also to be understood that a separate plate may be employed between the mold portions 10 and 14 to define the sides of the mold cavities while the top and bottom thereof are defined by the upper and lower mold portions respectively. The use of such a plate makes it possible to vary the dimensions of the mold cavity without having to alter the other components of the mold. The phrase "upper mold portion" then is intended to encompass the use of such a separate plate to define a portion of the mold cavities.

As will be evident to those skilled in the art, the mold cavities 22 and the transfer piston 24 can be vented to insure complete distribution of the molten charge 19. Other means may also be employed to remove excess plastic material than the dovetail slot 25 illustrated in the drawings. Such means could be employed in such a manner as to reduce the amount of excess. However, the dovetail slot 25 has been found to be particularly useful because it takes advantage of the fact that as the plastic material cools, it shrinks towards the center of the slot thereby facilitating removal of the cullet 19.

All normally solid thermoplastic resins which will flow under the influence of pressure when molten and which will undergo molecular shear when forced through a small area, such as the sprue forming channel 20, can be molded according to the present invention. Illustrative of such thermoplastics are polyolefins such as polyethylene and polypropylene, vinyl polymers, polystyrene, polycarbonates, polyethers such as polyhydroxyethers, polyarylene polyethers and the like, polyoxymethylenes, polyacrylates, adducts, interpolymers and mixtures thereof, and the like. Such thermoplastics can also contain conventional additives such as fillers, dyes, pigments, cross-linking agents, stabilizers, plasticizers, lubricants, antioxidants and the like.

The following examples are intended to further illustrate the present invention but not to limit the same in any manner.

*Example I*

Apparatus similar to that shown in the drawings was used but having only one mold cavity and without the aperture forming means. Polystyrene was fluxed in an extruder and a metered amount was placed in the transfer cylinder and a transfer piston was subsequently inserted therein. The mold and piston were placed under a Schrader air press which was advanced forcing the polystyrene into the mold cavity. The molded article was cooled and the cullet removed as described above. In this manner an excellent quality flashlight lens free from pellet outlines and half-moons was produced. The above procedure was also followed to produce star shaped articles from polystyrene and polyethylene.

*Example 2*

Apparatus similar to that shown in the drawings was used to mold sprue-free coaxial cable spacers. The ratio of the area of the face of the transfer piston to the area of the molded spacers was 1:1.3. Polyethylene having a melt index of 0.2–0.4 gm./10 min. and a density of .917–.922 gm./cc. was fluxed and conveyed in a 1½" Modern Plastics Machine Company extruder and conveyed to a metering pump which metered the molten polymer through a ⅝" nozzle into a continuously extruding molten rod. A reciprocating feeding and cutting mechanism was employed to cut a charge of molten polymer from the nozzle and convey and deposit the charge in a transfer cylinder. Retraction of the cutting mechanism then signaled the start of the molding cycle. Coaxial cable spacers were then continuously molded as shown in FIGURES 1, 5 and 6 for a period of 50 minutes under the following conditions.

| | | |
|---|---|---|
| Temperature of molten polyethylene | °C | 140 |
| Extruder back pressure | p.s.i | 1800 |
| Manifold back pressure | p.s.i | 900 |
| Mold temperature | °C | 18 |
| Transfer piston temperature | °C | 7 |
| Primary filling pressure | p.s.i | 4000 |
| Secondary filling pressure | p.s.i | 500–1000 |
| Duration of primary pressure | second | 0.08 |
| Duration of secondary pressure and sprue cooling in absence of positive pressure | do | 1.02 |
| Total molding cycle | do | 1.10 |
| Air nozzle discharge pressure | p.s.i | 80 |
| Duration of discharge | second | 0.7 |

Spot checks throughout the 50 minute run indicated that the spacers were sprue free and without flash and otherwise satisified dimensional and property specifications.

We claim:

1. Apparatus for molding thermoplastic articles which comprises means forming a lower mold portion, means forming an upper mold portion surmounting said lower mold portion, said lower and upper mold portions being adapted to cooperatively define at least one mold cavity therebetween and being further adapted to be separated for removing a molded article from therebetween, a transfer cylinder in said upper mold portion, a passageway in said upper mold portion in communication with said cylinder and which progressively decreases in cross section from said cylinder, a sprue forming channel in said upper mold in communication with said passageway and said mold cavity, said channel having a maximum diameter which is less than the minimum diameter of said passageway and progressively decreasing in cross section from said passageway and being sufficiently small to cause a molten thermoplastic material flowed therethrough to undergo molecular shear and thereby generate frictional heat, said transfer cylinder being adapted to receive a metered charge of molten thermoplastic material in an amount in excess of that required to fill said mold cavity and said sprue forming channel, piston means adapted to slide in said transfer cylinder to cause said molten thermoplastic material to fill said mold cavity and said sprue forming channel, means to cool said lower and upper mold portions and said piston means, said piston means being provided with means for removing cooled thermoplastic material from said sprue forming channel and cooled thermplastic material in excess thereof.

2. The apparatus of claim 1 which includes aperture forming means extending into said mold cavity and adapted to slide in said lower mold portion and in and out of said mold cavity.

3. The apparatus of claim 1 wherein said means for removing cooled thermoplastic material from said sprue forming channel comprises at least one slot in the face of said piston means positioned and shaped in such a manner so as to prevent binding of the cooled thermoplastic material therein.

4. The apparatus of claim 1 wherein said means for removing cooled thermoplastic material from said sprue forming channel comprises a tapering dovetail slot in the face of said piston means the center line of which coincides with a diameter line of said piston means.

5. Apparatus for molding a plurality of apertured, sprue free thermoplastic articles such as a coaxial cable spacer which comprises means forming a lower mold portion, means forming an upper mold portion surmounting said lower mold portion, said lower and upper mold portions being adapted to cooperatively define a plurality of mold cavities therebetween and being further adapted to be separated for removing molded articles from therebetween, aperture forming means extending into said mold cavities and adapted to slide in said lower mold portion and in and out of said mold cavities, a transfer cylinder in said upper mold portion, a plurality of passageways in said upper mold portion in communication with said cylinder and which progressively decrease in cross section from said cylinder, a plurality of sprue forming channels in said upper mold in communication with said passageways and said mold cavities, said channels having a maximum diameter which is less than the minimum diameter of said passageways and progressively decreasing in cross section from said passageways and being sufficiently small to cause a molten thermoplastic material flowed therethrough to undergo molecular shear and thereby generate frictional heat, said sprue forming channels being positioned so as to not interfere with said aperture forming means, said transfer cylinder being adapted to receive a metered charge of molten thermoplastic material in an amount in excess of that required to fill said mold cavities and said sprue forming channels, piston means adapted to slide in said transfer cylinder to cause said molten thermoplastic material to fill said mold cavities and said sprue forming channels, means to cool said lower and upper mold portions and said piston means, being provided with means for removing cooled thermoplastic material from said sprue forming channels and cooled thermoplastic material in excess thereof.

References Cited by the Examiner
UNITED STATES PATENTS

| | | | |
|---|---|---|---|
| 2,017,216 | 10/1935 | Marcus | 18—42 |
| 2,423,914 | 7/1947 | Wacker | 18—42 |
| 2,578,719 | 12/1951 | Maver et al. | 18—42 |
| 3,070,844 | 1/1963 | Warnken | 18—42 X |
| 3,071,814 | 1/1963 | Guggenheim | 18—42 X |

References Cited by the Applicant
UNITED STATES PATENTS

| | | |
|---|---|---|
| 211,090 | 1/1879 | French. |
| 2,269,880 | 1/1942 | Morin et al. |
| 2,293,633 | 8/1942 | Shaw. |
| 2,338,607 | 1/1944 | Wacker. |
| 2,956,309 | 10/1960 | Herbst. |
| 3,121,918 | 2/1964 | Jurgeleit. |
| 3,132,381 | 5/1964 | Bowen. |

J. SPENCER OVERHOLSER, *Primary Examiner.*

E. MAR, *Assistant Examiner.*